US006643505B1

(12) United States Patent
Kamperschroer (10) Patent No.: US 6,643,505 B1
(45) Date of Patent: Nov. 4, 2003

(54) METHOD FOR OPERATING A TELECOMMUNICATIONS NETWORK WITH A PERSONALIZED DATABASE

(75) Inventor: Erich Kamperschroer, Hamminkeln (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/508,740

(22) PCT Filed: Aug. 26, 1998

(86) PCT No.: PCT/DE98/02508
§ 371 (c)(1),
(2), (4) Date: Mar. 15, 2000

(87) PCT Pub. No.: WO99/14925
PCT Pub. Date: Mar. 25, 1999

(30) Foreign Application Priority Data

Sep. 15, 1997 (DE) .......................... 197 40 558

(51) Int. Cl.⁷ ................................. H04M 3/42
(52) U.S. Cl. ................ 455/414; 455/412; 455/466; 379/88.12
(58) Field of Search .................. 455/412, 413, 455/414, 415, 418, 419, 466, 9, 59, 61, 465; 379/88.12, 106.01, 164, 263, 1.02, 67.1

(56) References Cited

U.S. PATENT DOCUMENTS

| 5,313,515 | A |   | 5/1994  | Allen et al.              |
|-----------|---|---|---------|---------------------------|
| 5,682,600 | A | * | 10/1997 | Salin ................ 455/422 |
| 5,687,216 | A | * | 11/1997 | Svensson ............. 455/412 |
| 5,699,053 | A |   | 12/1997 | Jonsson                   |
| 5,758,279 | A | * | 5/1998  | Foti ................. 455/412 |
| 5,797,094 | A | * | 8/1998  | Houde et al. ......... 455/412 |
| 5,819,182 | A | * | 10/1998 | Gardner et al. ....... 455/524 |
| 5,889,839 | A |   | 3/1999  | Beyda et al.              |
| 5,909,483 | A | * | 6/1999  | Weare et al. ........ 379/88.18 |
| 5,946,629 | A | * | 8/1999  | Sawyer et al. ........ 455/466 |
| 6,212,161 | B1 | * | 4/2001 | Regula ............... 370/223 |
| 6,212,261 | B1 | * | 4/2001 | Meubus et al. ...... 379/88.12 |
| 6,351,522 | B1 | * | 2/2002 | Vitikainen .......... 379/67.1 |
| 6,366,772 | B1 | * | 4/2002 | Arnson ............... 455/415 |
| 6,560,216 | B1 | * | 5/2003 | McNiff et al. ........ 370/349 |

FOREIGN PATENT DOCUMENTS

| DE | 196 43 645   | 4/1998  |
| EP | 0 831 664    | 3/1998  |
| EP | 0 889 662    | 1/1999  |
| WO | WO 93/16564  | 8/1993  |
| WO | WO 93/21719  | 10/1993 |
| WO | WO 94/10764  | 5/1994  |
| WO | WO 95/05040  | 2/1995  |

OTHER PUBLICATIONS

Standard ECMA–241 2nd Edition—Sep. 1997, Standardizing Information and Communication Systems, Private Integrated Services Network (PISN)–Specification, Functional Model & Information Flows–Message Waiting Indication Supplementary Service, pp. 1–18.

(List continued on next page.)

Primary Examiner—William Trost
Assistant Examiner—Congvan Tran
(74) Attorney, Agent, or Firm—Bell, Boyd & Lloyd LLC (57) ABSTRACT

In the transmission of "MWI-service"-specific messages in telecommunication networks, particularly in hybrid DECT/ISDN-specific telecommunication networks, in order to be able to distinguish between internal and external messages of the system for the purpose of displaying messages which are stored in telecommunication systems for telecommunication subscribers, one arrangement (e.g. the DECT base station), which sends or forwards the MWI message to a terminal device (e.g. the DECT mobile part) that is allocated and connected to it, transmits an additional indication which unambiguously distinguishes between internal and external events.

22 Claims, 8 Drawing Sheets

OTHER PUBLICATIONS

Standard ECMA–241 3rd Edition—Dec. 1998, Standardizing Information and Communication Systems, Private Integrated Services Network (PISN)–Specification, Functional Model & Information Flows–Message Waiting Indication Supplementary Service, pp. 1–18.

D. Falconer, et al., "Time Division Multiple Access Methods for Wireless Personal Communications", IEEE Communications Magazine, Jan. 1995, pp. 50–57.

D. Pilger, "Strutkur des DECT–Standards", Nachrichtentechnik Elektronik, Berlin, vol. 42:1, 1992, pp. 23–29.

ETSI Publication ETS 300 175–1 to 9, Oct. 1992.

J. Koch, "Digitaler Komfort Für schnurlose Telekommunikation", Telecom Report, vol. 14, No. 11, 1993, pp. 26–27.

C. Gunther, et al., "Wege zur universellen mobilen Telekommunikation", Das technische Magazin von ascom, tec 2/93, pp. 35–42.

R. Mulder, "DECT, a universal cordless access system", Philips Telecommunication Review, vol. 49, No. 3, Sep. 1991, pp. 68–73.

ETSI Publication PrETS 300 444, Final Draft, Apr. 1995.

S. Althammer, et al., "Hochoptimierte ICs für DECTSchnurlostelefone", Components, vol. 31, No. 6, 1993, pp. 215–218.

"Protokolle am Beispiel des OSI–Referenzmodells", Unterrichtsblatter—Deutsche Telekom, Issue 48, Feb. 1995, pp. 102–111.

A. Elberse, et al., "DECT Data Services—DECT in Fixed and Mobile Networks", Jun. 17–18, 1996, Hotel Sofitel, Paris, France, pp. 1–12 and Summary of Preparation.

ETSI Publication, "In Architecture and Functionality for the support of CTM", Work Item No. DTR/NA–061302, Draft Version 1.10, Sep. 1995.

ETSI Publciation, "Cordless Terminal Mobility (CTM)—Phase 1; Service Description", Item No. DE/NA–010039, Draft Version 6, Oct. 2, 1995.

ETSI Publication ETS 300 824 Draft, Nov. 1996.

H. Reichwaldt, "Radio in the Local Loop", Nachrichtentechnik Elektronik, Berlin, vol. 45, No. 3, 1995, pp. 29–30.

W. Hing, et al., "Cordless Access to the ISDN basic rate service", IEE Colloquium 1993, vol. 173, 1993, pp. 29/1–29/7.

ETSI Publication prETS 300 822, Draft, Feb. 1997.

W. Barwald, "Schmittsstellen in der Telekommunikation", Parts 1–10, Nachrichtentechnik Elektronik, Berlin, 1993; Part i–vol. 41:3, pp. 99–102; Part 2–vol. 41:4, pp. 138–143; Part 3–vol. 41:5, pp. 179–182, vol. 41:6, pp, 219–220; Part 4–vol. 41:6, pp. 220–222, vol. 42:1, pp. 19–20; Part 5–vol. 42:2, pp. 59–62, vol. 42:3, pp. 99–102; Part. 6–vol. 42:4, pp. 150–153; Part 7–vol. 42:6, pp. 238–241; Part 8–vol. 43:1, pp. 29–33;Part 9–vol. 43:2, pp. 95–97, vol. 43:3, pp. 129–135; Part 10–vol. 43:4, pp. 187–190.

A. mann, "Der GSM–Standard—Grundlage für digitale europäische Mobilfunknetze", Informatik–Spektrum, Berlin, vol. 14, No. 3, 1991, pp. 173–153.

ETSI Publication pr ETS 300 650, Draft rev. 4, Oct. 1996.

ETSI Publication pr ETS 300 745–1, Draft rev. 2, Oct. 1996.

ETSI Publication pr ETS 300 764, May 1997.

ETSI Minutes of RES–03/N Meeting #2, May 20–22, 1996 in Madrid, Spain, pp. 1–2.

ETSI Publication ETS 300 175–5, Seconed Edition, Sep. 1996.

* cited by examiner

FIG. 10  Hybrid (for example, ISDN/DEC-specific) telecommunication network TKN

METHOD FOR OPERATING A TELECOMMUNICATIONS NETWORK WITH A PERSONALIZED DATABASE

BACKGROUND OF THE INVENTION

The present invention relates to a method for transmitting messages that are specific to "MWI Service" in telecommunication Networks, particularly in hybrid DECT/ISDN-Specific Telecommunication Networks.

In message systems having a message transmission path between a message source and a message sink, transmitting and receiving devices are used for processing and transmitting messages, in which devices 1) the message processing and transmission can be accomplished in a preferred direction of transmission (simplex mode) or in both directions (duplex mode), 2) the message processing is analog or digital, 3) messages are transmitted over the telecommunication path wirelessly on the basis of diverse message transmission methods FDMA (Frequency Division Multiple Access), TDMA (Time Division Multiple Access) and/or CDMA (code Division Multiple Access), for instance in accordance with radio standards such as DECT, GSM, WACS, or PACS, IS-54, IS-95, PHS, PDC, etc., (cf. IEEE Communications Magazine, January 1995, pp. 50–57; DD Falconer et al: "Time Division Multiple ACCESS Methods for Wireless Personal Communications"), and/or are transmitted over wire.

"Message" is an overarching term referring both to the meaningful content (information) and the physical representation (signal). Despite the same content of a message—i.e. the same information—different signal forms can occur. Thus, a message relating to a subject matter can be transmitted (1) in the form of an image, (2) as a spoken word, (3) as a written word, (4) as an encrypted word or image.

The type of transmission in accordance with images, spoken words, and written words is normally characterized by continuous (analog) signals, while in the type of transmission in accordance with encrypted words or image discontinuous signals (e.g. impulses, digital signals) usually occur.

Based on this general definition of a message system, the present invention relates to a method for transmitting messages which are specific to "MWI service" in telecommunication networks, particularly in hybrid DECT/ISDN-specific telecommunication networks.

Hybrid telecommunication networks include network containing various wireless and/or wirebound telecommunication subnetworks or subsystems.

Telecommunication systems of the above described type include DECT systems [Digital Enhanced (previously: European) Cordless Telecommunication; cf. (1): Nachrichten Elektronik 42 (1992) Jan/Feb, Nr. 1, Berlin, Del.; U. Pilger "Struktur des DECT Standards", pp. 23–39 together with ETSI Publication ETS 300175-1 . . . 9, October 1992; (2): Telcom Report 16 (1993), Nr. 1, J. H. Koch: "Digitaler Komfort für schnurlose Telekommunikation—DECT Standard eroffnete neue Nutzungsgebiete", pp. 26 and 27; (3): tec 2/93—The technical magazine by Ascom "Wege zur universellen mobilen Telekommunikation", pp. 35–42; (4) Philips Telecommunication Review, Vol.49, No. 3, September 1991, R. J. Mulder: "DECT, a Universal Cordless Access System"; (5): WO 93/21719 (FIGS. 1 to 3 with description)] or GAP systems (Generic Access Profile; cf. ETSI Publication ETS 300444, December 1995, ETSI, FR), which can be constructed according to the representation in FIG. 1, for example. The GAP standard is a subset of the DECT standard, whose object is to ensure the interoperability of the DECT air interfaces for telephone applications.

Figure 1:
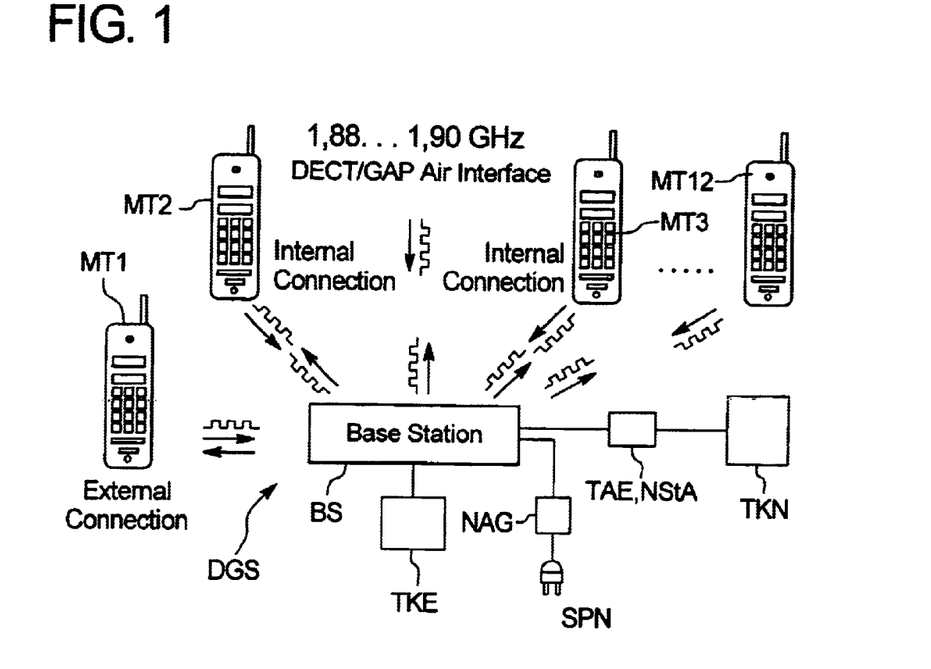
FIG. 1 is a block diagram of a telecommunications system.

In accordance with the DECT/GAP standard, according to the representation in FIG. 1, at a DECT/GAP base station BS of a DECT/GAP system DGS a maximum of 12 connections can be set up, in accordance with the DECT/FDMA/TDD method, parallel to DECT/GAP mobile parts MT1 . . . MT12 via a DECT/GAP air interface that is laid out for the frequency range between 1.88 and 1.90 GHz. The number 12 derives from a number "k" of time slots or telephone channels, that are available for the duplex mode of the DECT GAP system DGS (k=12). The connections can be internal or external. Given an internal connection, two mobile parts, for instance mobile parts MT2 and MT3, that are registered at the base station BS can communicate with one another. For the construction of an external connection, the base station BS is connected to a telecommunication network TKN, for instance in a wirebound manner via a telecommunication terminal unit TAE, or a private branch exchange NStA is connected to a cablebound telecommunication network or in accordance with PCT Patent Application No. 95/05040 to a higher-ranking telecommunication network wirelessly as a repeater station. Given external connection, using a mobile part, for instance mobile part MT1, it is possible to comnmunicate with a subscriber in the telecommunication network TKN via the base station BS and the telecommunication terminal unit TAE or private branch exchange NStA. If the base station BS has only one connection to the telecommunication terminal unit TAE or to the private branch exchange NStA, as in the case of the gigaset 951 (Siemens cordless telephone, see telecom report 16 (1993), vol. 1, pp. 26 and 27), then only one external connection can be set up. If the base station BS has two connections to the telecommunication network TKN,—as in the case of the gigaset 952 (Siemens cordless telephone, see telecom report 16, (1993), vol. 1, pp.26–27), then, besides the external connection to the mobile part MT1, an additional external connection is possible from a wirebound communication terminal device TKE that is connected to the base station BS. In principle, it is also imaginable that a second mobile part, for instance mobile part MT2, would use the second connection for an external connection, instead of the communication terminal device TKE. Whereas the mobile parts MT1 . . . MT2 are driven by a battery or an accumulator, the base station BS, which is implemented as a cordless advanced network processor system, is connected to a voltage network SPN via a network terminal device NAG.

Figure 2:
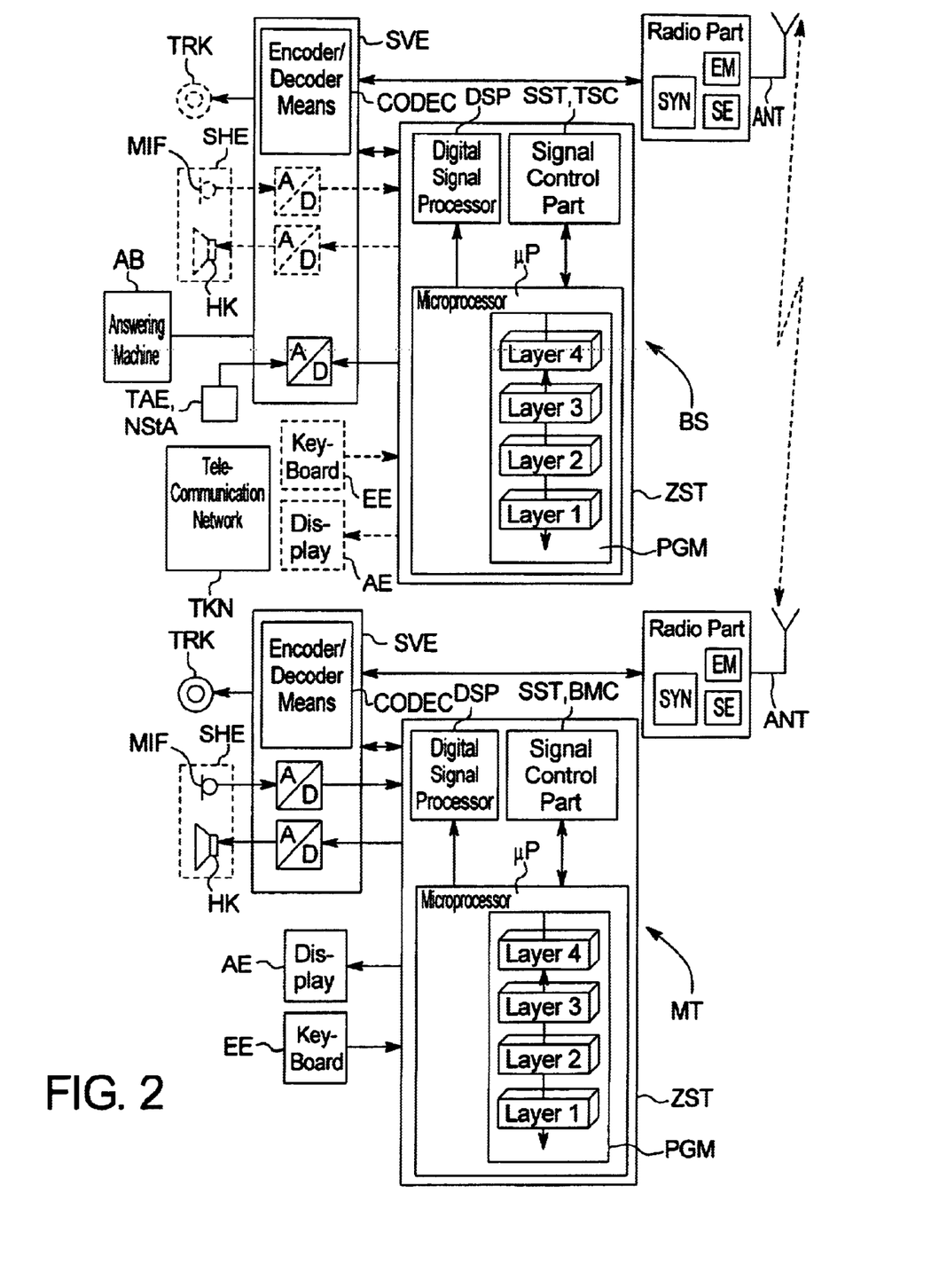
FIG. 2 is a functional block diagram of the fundamental circuit, structure of the base station and of the mobile part.

FIG. 2 shows the principal circuit construction of the base station BS and the mobile part MT on the basis of the reference *Components* 31 (1993), Vol. 6, pp. 215 to 218; S. Althammer, D. Brückmann. "Hochoptimierte ICs für DECT Schnurlostelefone". The base station BS and the mobile part MT comprise a radio part FKT having an antenna ANT, which is allocated to transmission and reception of radio signals, as well as a signal processor SVE and a central control ZST, which are connected to one another in the manner depicted. The radio part FKT essentially contains the known systems such as transmitter SE, receiver EM and synthesizer SYN. The signal processing system SVE contains a coder/decoder CODEC, among other systems. The central control ZST comprises a microprocessor µP for both the base station BS and the mobile part MT, which has a program module that is constructed in accordance with the OSI/ISO layer model [see. (1): Instructional publications—Deutsche telecom, Issue 48, 2/1995, pp. 102 to 111; (2): ETSI Publication ETS 300175-1 . . . 9, October 1992], a signal control part SST, and a digital signal processor DSP, which are connected to one another as illustrated. Of the layers that are defined in the layer model, only the first four layers are shown, which are of immediate and critical importance to the base station BS and the mobile part MT. The signal control part SST is realized in the base station BS as a time switch controller TSC and in the mobile part MT as a burst mode controller BMC. The critical difference between the two signal control parts TSC, BMC is that the signal control part TSC that is specific to the base station BS assumes additional switching functions beyond those performed by the signal control part MT BMC that is specific to the mobile part.

The principal mode of operation of the above described circuit units is described in the above cited reference *Components* 31 (1993), vol. 6, pp 215–218.

The described circuit construction according to FIG. 2 is expanded in the base station BS and the mobile part MT by additional functional units according to their function in the DECT/GAP system according to FIG. 1.

The base station BS is connected to the telecommunication network TKN via the signal processing system SVE and the telecommunication terminal unit TAE, or the private branch exchange NStA, and it additionally comprises an answering machine AB. As an option, the base station BS can also have an operator interface (hatched units in FIG. 2), consisting, for example, of an input means EE implemented as a keyboard, a display means AE implemented as a screen, a speaking/listening device SHE implemented as a handset having a microphone SHE and a receiver inset HK, and a tone ringing bell TRK.

The mobile part MT comprises the user interface that is a possible option of the base station BS, which has the above described operating elements that pertain to this user interface.

Figure 3:
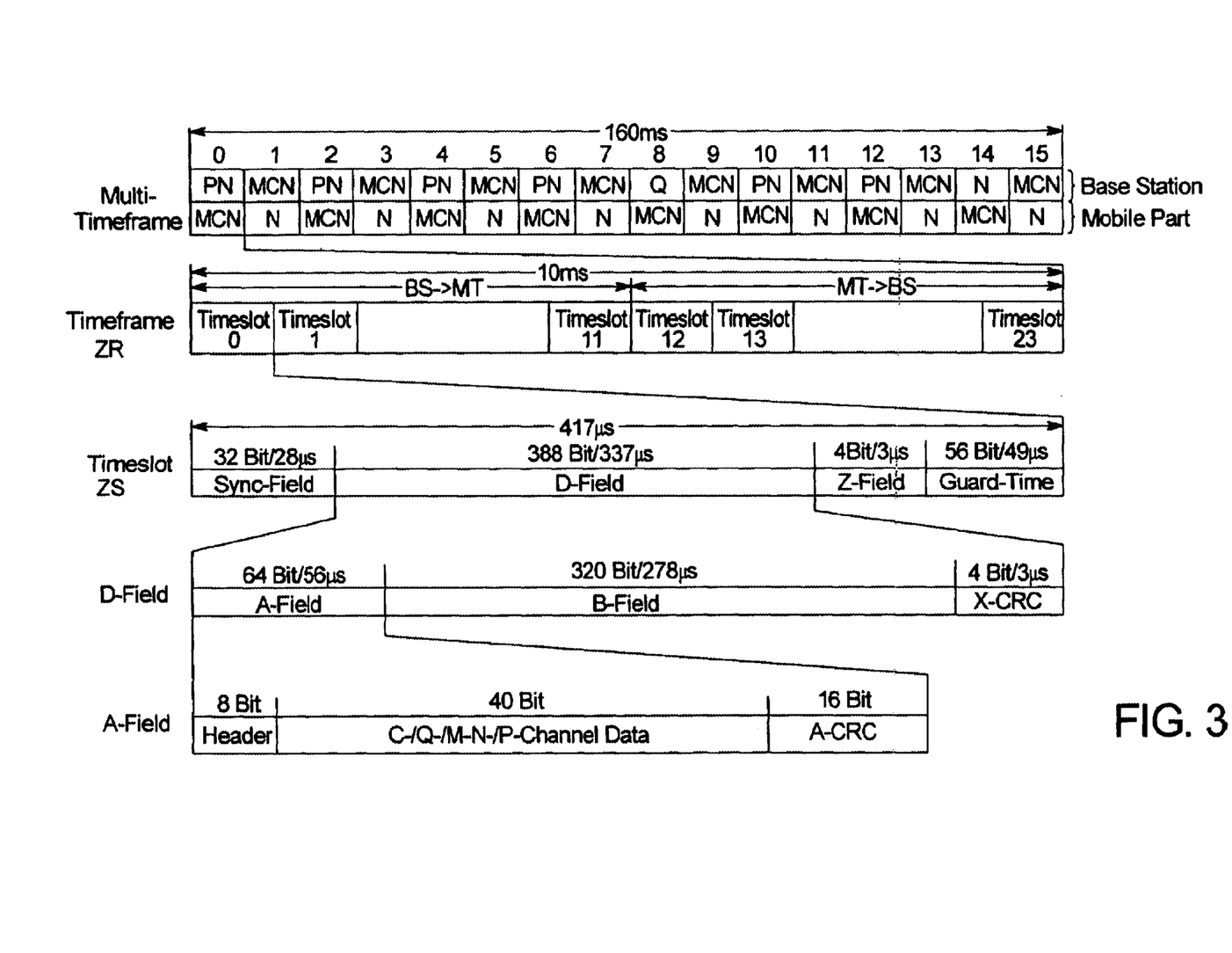
FIG. 3 is a collection of signal diagrams of the TDMA structure of the DECT/GAP system.

FIG. 3 shows the TDMA structure of the DECT/GAP system DGS (see "Nachrichtentechnik Elektronik 42 (1992) Jan/Feb, Nr. 1, Berlin, Del.; U. Pilger: "Struktur des DECT Standards", pp 23–29 with ETS 300 175-1 . . . 9, October 1992"). The DECT/GAP system is a hybrid system in terms of the multiplex method, wherein radio messages can be transmitted from the base station BS to the mobile part MT and from the mobile part MT to the base station BS (Time Division Duplex mode) in accordance with the FDMA principle on ten frequencies in the frequency band between 1.88 and 1.9 Ghz in accordance with the TDMA principle according to FIG. 2 in a predetermined time sequence. The time sequence is determined by a multi-time-frame MZR, which occurs every 160 ms and which has 16 time frames ZR with a duration of 10 ms each. In these time frames ZR, information relating to a C, M, N, P, Q channel that is defined in DECT is transmitted to the base station BS and the mobile part MT separately. When information for several of these channels is transmitted in one time frame ZR, the transmission follows a priority list with M>C>N and P>N. Each of the 16 time frames ZR of the multi-time-frame MZR is subdivided into 24 time slots ZS, in turn, each having a duration of 417 Ps, 12 of which (time slots 0 . . . 11) are specified for the transmission direction "base station BS→mobile part MT", and the other 12 of which (time slots 12 . . . 23) are specified for the direction "mobile part MT→base station BS." In each of these time slots ZS, information having a bit length of 480 bits is transmitted in accordance with the DECT standard. Of these 480 bits, 32 bits are transmitted as synchronization information in a SYNC field, and 388 bits are transmitted as message information in a D field. The remaining 60 bits are transmitted as additional information in a Z field and as security information in a field "guard time". The 388 bits of the D field which are transmitted as payload information are subdivided in turn into a 64-bit A field, a 320-bit B field, and a 4-bit "X-CRC" word. The 64-bit A field is composed of an 8-bit data header, a 40-bit data record with data for the C, Q, M, N, P channels, and a 16-bit "A-CRC word".

Figure 4:
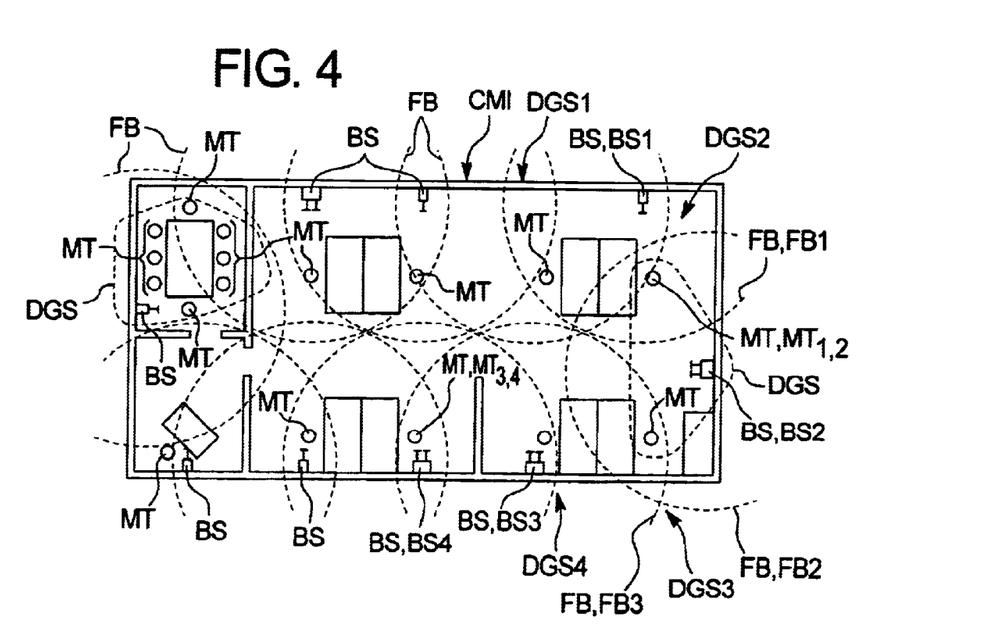
FIG. 4 is a diagram of a cellular DECT/GAP multi-system.

On the basis of the DECT/GAP system DGS according to FIG. 1, FIG. 4 shows a cellular DECT/GAP multisystem CMI (Cordless Multicell Integration), in which several of the above described DECT/GAP systems DGS are present, each having a base station BS and one/several mobile part(s) MT at an arbitrary geographic location; for instance, concentrated in an administration building having open-plan offices on several floors in an office building (in the sense of a hot spot arrangement). However, instead of a "closed" geographic location such as an office building, an "open" geographical location with strategic telecommunication importance—such as city squares having a high volume of traffic, a high concentration of businesses and a large flow of people—is also possible for the installation of a cellular DECT/GAP multi-system CMI. Part of the base stations BS that are arranged in the open-area office are realized as antenna diversity base stations in accordance with PCT patent application Ser. No. 94/10764, in contrast to the base stations illustrated in FIGS. 1 and 2. The concentration of the DECT/GAP systems DGS is expressed (contiguous radio coverage of the geographic location) such that individual DECT/GAP systems DGS operate in the same environment by virtue of the overlapping DECT/GAP radio coverage areas FB.

Depending on the degree of overlap, identical environment can mean that: a) a first base station BS1 of a first DECT/GAP system DGSI is arranged in a first radio coverage area FB1, and a second base station BS2 of a second DECT/GAP system DGS2 is arranged in a second radio coverage area FB2, which systems can set up telecommunication connections to at least one mobile part $MT_{1,2}$, b) a third base station BS3 of a third DECT/GAP system DSG3 and a fourth base station BS4 of a fourth DECT/GAP system DGS4 are arranged in a common third radio coverage area FB3 and can set up telecommunication connections to at least one mobile part $MT_{3,4}$.

The cordless telecommunication scenario illustrated in FIGS. 1 to 4, in which DECT mobile parts can be connected to a private (residential) DECT base station (FIG. 1 ) or to one or more private or public DECT base stations (FIG. 4), via a DECT air interface can now be expanded in accordance with the publication "Lecture by A. Elberse, M. Barry, G. Fleming. "*DECT Data Services—DECT in Fixed and Mobile Networks*", Jun. 17./18. 1996, Hotel Sofitel, Paris;pp 1–12 and abstract" such that the DECT mobile parts are connectible to private and public DECT base stations via the DECT air interface.

According to PCT Patent Application No. 95/5040 (see FIGS. 3 through 8 therein with the respectively pertaining description), this scenario can then in turn be expanded in view of a universal mobile telecommunication system (UMTS) to the effect that pico-cell-related cordless telecommunication systems (for example, the previously discussed DECT systems from CTM points of view (cordless terminal mobility; CETSI Publications (1): "IN Architecture and Functionality for the support of CTM", Draft Version 1.10, September 1995; (2): "Cordless Terminal Mobility (CTM)—Phase 1, Service Description", draft DE/NA-010039, Version 6, Oct. 2, 1995) be linked into a higher-ranking network INFRA structure (for example, ISDN, PTSN, GSM and/or satellite networks) for accesses (see ETSI Publication, "CTM Access Profile (CAP)", prETS 300824, November 1996). According to patent claim 1 of PCT Patent Application No. 95/05040, this can be achieved by a DECT base station fashioned as DECT repeater. In a universal mobile telecommunication system, DECT is mainly understood as a "network access technology" for mobile communication services (see the presentation of A. Elberse, M. Barry, G. Fleming on the subject, "DECT Data Services—DECT in Fixed and Mobile Networks", Jun. 17/18, 1996, Hotel Sofitel, Paris; Pages 1 through 12 and summary) and not as a network.

Figure 5:
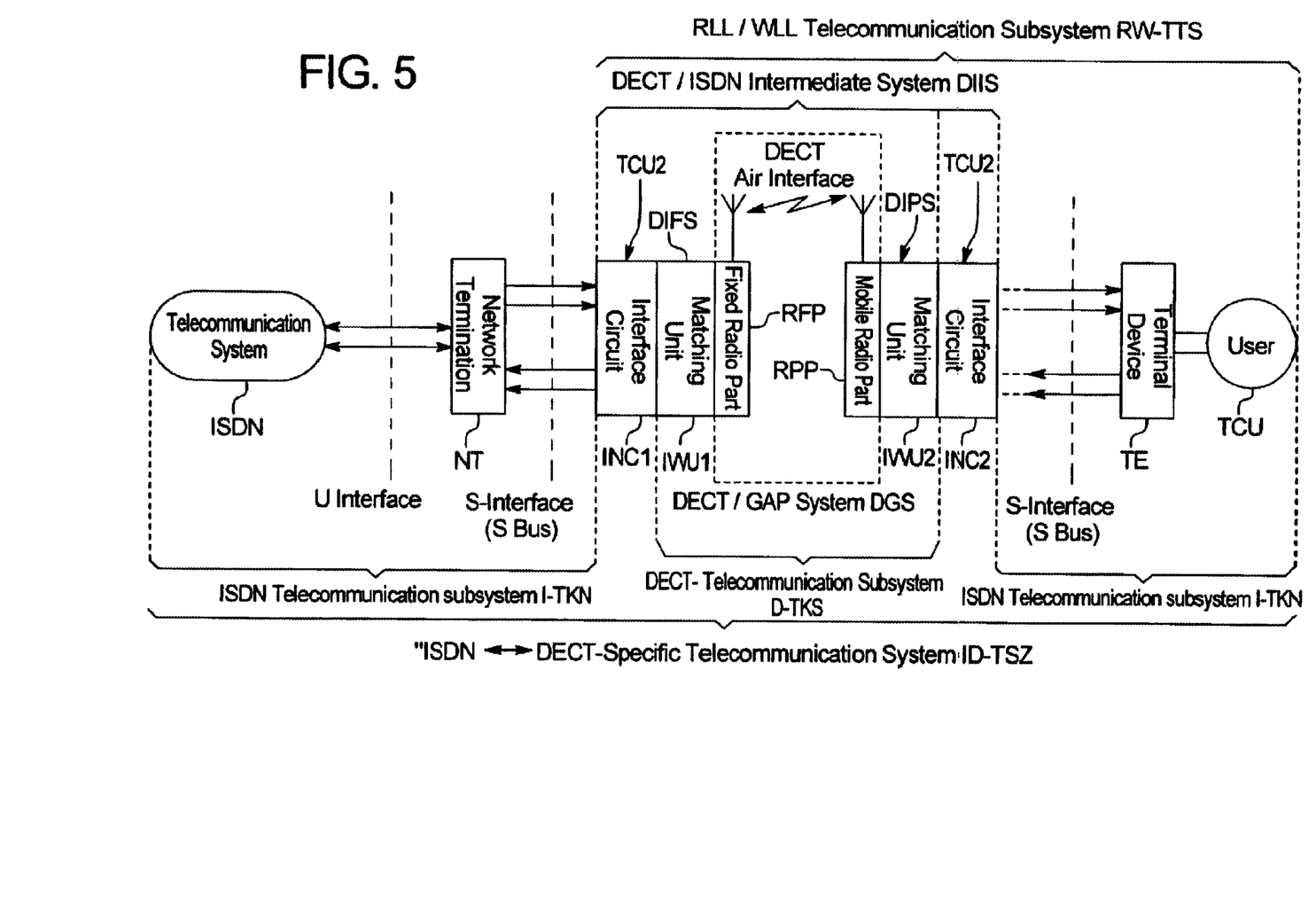
FIG. 5 is a block diagram of an ISDN⇆DECT telecommunication system with an ISDN telecommunication subsystem.

Standing for the scenario presented above, FIG. 5—proceeding from the publications "Nachrichtentechnik Elektronik", Berlin 45, (1995), No.1, Page 21 through 23 and No. 3, Pages 29 and 30, as well as IEE Colloqium 1993, 173; (1993), pages 29/1–29/7, W. Hing, F. Halsall: "Cordless access to the ISDN basic rate service" on the basis of a DECT/ISDN intermediate system DIIS according to ETSI Publication prETS—300822, February 1997—shows an ISDN⇆DECT Telecommunication system ID-TSZ (Integrated Services Digital Network⇆Digital Enhanced Cordless Telecommunication) with an ISDN telecommunication sub-system I-TKN [see the publication "Nachrichtentechnik Elektronik", Berlin 41–43, Parts 1 through 10, Part 1: (1991) No. 3, pages 99 through 102; Part 2: (1991) No. 4, pages 138 through 143; Part 3: (1991) No. 5, Pages 179 through 182 and No. 6, pages 219 through 220; Part 4: (1991) No. 6, pages 220 through 222 and (1992) No. 1, pages 19 through 20; Part 5: (1992) No. 2, pages 59 through 62 and (1992) No. 3, pages 99 through 102; Part 6: (1992) No. 4, pages 150 through 153; Part 7: (1992) No. 6, pages 238 through 241; Part 8: (1993) No. 1, pages 29 through 33; Part 9: (1993) No. 2, pages 95 through 97 and (1993) No. 3, pages 129 through 135; Part 10: (1993) No. 4, pages 187 through 190] and a DECT telecommunication sub-system D-TTS.

As shall be explained in greater detail below, the DECT telecommunication system D-TKS can thereby be a component part of a DECT/ISDN intermediate system DIIS or of a RLL/WLL telecommunication sub-system RW-TTS. The DECT telecommunication system D-TKS and, thus, the DECT/ISDN intermediate system DIIS or the RLL/WLL telecommunication sub-system RW-TTS are preferably based on a DECT/GAP system GDS as shown, for example, in FIG. 1.

Alternatively, the DECT/ISDN intermediate system DIIS or the RLL/WLL telecommunication sub-system RW-TTS can also be based on a GSM system (global system for mobile communication; see Informatik Spektrum 14 (1991) June, No. 3, Berlin, Del.; A. Mann: "Der GSM-Standard—Grundlage für digitale europäische Mobilfunknetze", pages 137 through 152). Instead, it is also possible within the scope of a UMTS scenario that the ISDN telecommunication system I-TKN is fashioned as GSM system or as PSTN system (public switched telecommunications network).

Coming into consideration over and above this as further possibilities for the realization of the DECT/ISDN intermediate system DIIS or of the RLL/WLL telecommunication sub-system RW-TTS or of the ISDN telecommunication sub-system RW-TTS are the initially cited systems as well as future systems that are based on known multiple access methods FDMA, TDMA, CDMA (Frequency Division Multiple Access, Time Division Multiple Access, Code Division Multiple Access) and hybrid multiple access methods formed therefrom.

The employment of radio channels (for example DECT channels) in classic line-bound telecommunication systems such as the ISDN (RLL/WLL scenario) is gaining increasingly in significance, particularly as viewed against the background of future, alternative network operators without their own complete wire network.

Given, for example, the RLL/WLL telecommunication sub-system RW-TTS, thus, the wireless connection technique RLL/WLL (radio in the local loop/wireless in the local loop) shall make ISDN services available to the ISDN subscriber at standard ISDN interfaces, for example upon involvement of the DECT system DS (see FIG. 4).

In the ISDN⇆DECT telecommunication system ID-TS according to FIG. 5, a first telecommunication subscriber (user) TCU1 (telecommunication user) has his terminal equipment TE (terminal endpoint; terminal equipment) linked into the ISDN world with the services available therein, for example, via a standardized S-interface (S-bus), the DECT/ISDN intermediate system DIIS fashioned as local message transmission loop—preferably DECT-specific and contained in the RLL/WLL telecommunication sub-system RW-TTS—a network termination NT, and a standardized U-interface of the ISDN telecommunication sub-system I-TTS and, second, a second telecommunication subscriber TCU2 is also linked into said ISDN world with the services available therein as ultimate user of the DECT/ISDN intermediate system DIIS.

The DECT/ISDN intermediate system DIIS is essentially composed of two telecommunication interfaces, of a first telecommunication interface DIFS (DECT intermediate fixed system) and of a second telecommunication interface DIPS (DECT intermediate portable system) that are wirelessly connected to one another, for example via a DECT air interface. Due to the quasi-location-bound, first telecommunication interface DIFS, the DECT/ISDN intermediate system DIIS forms the local message transmission loop defined above in this context. The first telecommunication interface DIIS contains a radio fixed part RFP, an interworking unit IWU1 and an interface circuit INC1 to the S-interface. The second telecommunication interface DIPS contains a radio portable RPP and an interworking unit IWU2 and, potentially, an interface circuit INC2 to the S-interface. The radio fixed part RFP and the radio portable RPP thereby form the known DECT/GAP system DGS.

As already mentioned, FIG. 5 shows, first, (first possibility), how the DECT/ISDN intermediate system DIIS is linked into the ISDN telecommunication system I-TKN as local message transmission loop within the framework of the RLL/WLL telecommunication sub-system RW-TTS as typical RLL/WLL scenario and, second (second possibility), how the DECT/ISDN intermediate system DIIS is only connected to the ISDN telecommunication system I-TKN at the network side as seen from CAP points of view (cordless terminal ability access profiles). Given the second possibility, the interface circuit INC2 of the second telecommunication interface DIPS to the S-interface is not active or is not present at all. In order to graphically present and support this situation overall, the interface circuit INC2 of the second telecommunication interface DIPS is shown with broken lines. Whereas the second telecommunication interface DIPS given the first possibility, for example, is not fashioned mobile part-specific, i.e. with user interface, the second telecommunication interface DIPS in the second possibility is fashioned as typical mobile part with a user interface.

In the scope of the CTM Access Profile (CAP), which is standardized by ETSI, it is intended to realize the call-independent service "Message Waiting Indication" (MWI) (cf. ETSI Publication "CTMACCESS Profile (CAP)" prETS300???, September 1996, chapt. 4. Introduction).

MWI service informs the user of a cordless mobile part (for instance, a DECT mobilepart) that a message for the user is present in the network. This message can indicate that a third party has tried to call the user (e.g. indication of the status of voice mailbox) or that the third party has left the user a short message.

In accordance with the publications [(1) ETSI publication De.NA-010 033 "ISDN, Message Waiting Indication (MWI) Supplementary Service, Service Description", Stage 1, Standard for MWI in Fixed (Public) ISDN, Draft version 5, October 1995); (2): ETSI Publication DE/SPS-05069-1: "ISDN, Message Waiting Indication (MWI) Supplementary Service, Digital Subscriber Signaling System No. 1(DSS1) Protocol, Part 1: Protocol Specification", stage 3, Standard for MWI in Fixed (Public) ISDN, Version 5 rev. 1, September 1995); (3): ECMA Publication "Private Telecommunication Networks (PTN), Specification, Functional Model and Information flows, Message Waiting Indication Supplementary Service", Stage 1, Second Standard for MWI and PTN's, Interim Fifth Draft, September 1995], various mandatory or optional MWI-specific procedures for providing MWI service are defined.

The mandatory procedures include;
1. a REGISTER procedure, with which a user of the MWI service provided in a network is registered by the network company manually, and
2. an INDICATE procedure, with which the message type and the number of messages for the user of the MWI service are indicated to him.

The optional procedures include the ACTIVATE or DEACTIVATE procedures or an INTERROGATE procedure, which are not discussed further in the context of the present invention.

Of the mandatory procedures, only the INDICATE procedure is examined and described more comprehensively here. The relevant comments can basically be applied to the other procedures that are mentioned above in an equivalent manner. Beyond this, with the procedures cited above for providing MWI service, service-specific parameters are transmitted, which like the procedures, are either mandatory or optional. The mandatory parameters include;

1) the type of message for the user,
2) the number of messages for the user that are of the type defined according to 1.

The optional parameters include a message identifier assigned by the network, a CLIP number with which the calling person can be identified, and a date and time stamp of the received or deleted messages.

The MWI service is communicated and made available to the user of the DECT mobile part via a user-specific "user interface" (man machine interface); for instance, by tone signaling, displaying the MWI text, providing MWI-specific menu displays, and so on.

A variety of suggestions for realizing an MWI service have already been introduced and discussed publicly.

For example, one concept is to realize the MWI service, which is not mentioned explicitly in either the GSM standard or in the DECT/GSM standard, implicitly by transmitting a short message as provided in the GSM standard and in the DECT/GSM standard (ETSI Publication preETS 300764, April 1995;) (cf. Presentation by CSELT, ITALTEL and TELECOM ITALIA at the "ETSI-RES-03 N" meeting of May 20–22, 1996 in Madrid, 2 pages). Here, the DECT-specific information element "IWU-TO-IWU" (ETSI publication ETS 300175-5, October 1992, 7.7.23 and Annex G.3) are supposed to be used by a DECT base station (Fixed Part FP) that is connected to the DECT mobile part (Portable Part PP) by a DECT air interface for the transmission of the MWI service. In this proposal, the DECT mobile part for providing the MWI service must store the short messages with a length of e.g. 160 information units. The storage of short messages, as is common in GSM handhelds, is undesirable for the present DECT mobile parts due to the increase in the price of the mobile part that is associated with this storage process.

A further proposal for realizing the MWI service is concerned with how to implement the MWI service for DECT/ISDN systems. Proceeding from the publications (1): ETSI Publication De/NA-010 033 "ISDN, Message Waiting Indication (MWI) Supplementary Service, Service Description," Stage 1, Standard for MWI in Fixed (Public) ISDN, Draft Version 5, October 1995); (2): ETSI Publication DE/SPS-05069-1: "ISDN, Message Waiting Indication (MWI) Supplementary Service, Digital Subscriber Signalling System no. 1 (DSSI) Protocol, Part 1: Protocol Specification", Stage 3, Standard for MWI in Fixed (Public) ISDN, Version 5, rev. 1, September 1995); and (3) ECMA Publication "Private Telecommunication Networks (PTN), Specification, Functional Model and Information flows, Message Waiting Indication Supplementary Service", Stage 1, Second Standard for MWI and PTN's, Interim Fifth Draft, September 1995 and ETSI Publication ETS 300 175-5, October 1992, chapter 7.7.15, the underlying idea of this proposal is the transparent transmission, via the DECT air interface, of ISDN-specific services (such as the MWI Service) on the DECT side with the DECT protocol-specific information element "FACILITY". This proposal contains a singular DECT/ISDN-specific solution which is suitable for realizing the MWI service for the CAP standard underlying the universal mobile telecommunication system.

A further alternative involves realizing the MWI service via a proprietary protocol, the DECT-specific information element "ESCAPE TO PROPRIETARY" being used in this proprietary protocol (cf. ETSI Publicatoin 300 175-5, March 1996, chap. 7.7.45). This proprietary solution is likewise unsuitable for the CAP standard.

Figure 6:
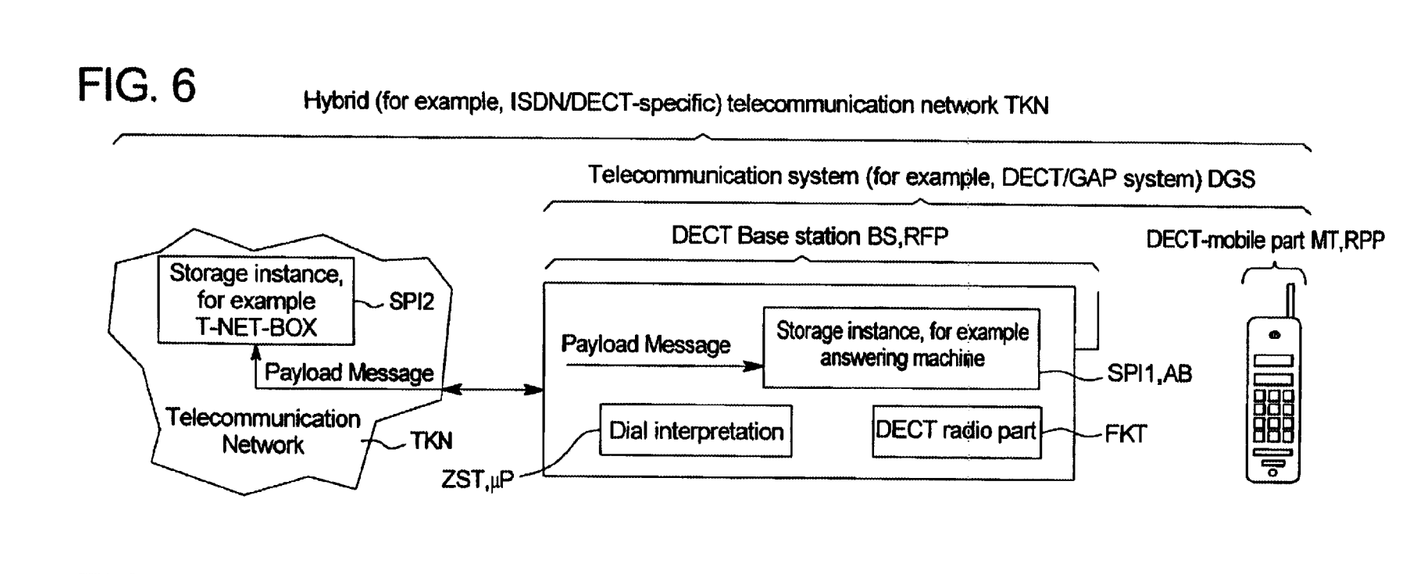
FIG. 6 is a functional block diagram of an MWI transmission.

FIG. 6 shows one possible arrangement (configuration) for an MWI transmission (MWI scenario) based on the above embodiments. The configuration is a hybrid, for instance ISDN/DECT-specific telecommunication scenario ID-TSZ with a telecommunication network TKN that is fashioned as an ISDN network and a telecommucniatoin system DGS that is fashioned as a DECT/GAP system. The telecommunication system contains at least one DECT base station BS, RFP and at least one DECT mobile part MT, RPP that can be connected to the base station by wireless telecommunication. The mobile part MT, RPP and the base station BS, RFP are set up in accordance with the representation in FIG. 2. Individual functional units in the base station that are individual for explicating the MWI transmission are represented again. These functional units include the DECT radio part FKT, the central control ZST with microprocessor $\mu$P for selection code interpretation, and the answering machine AB, which is the designated storage entity in the MWI context. Since the depicted configuration contains an additional storage entity, for instance what is known as the T-NET-BOX, which is arranged outside the telecommunication system DGS in the telecommunication network TKN, the storage entity that is realized as answering machine AB is designated INTERNAL storage entity or first storage entity SPI1, and the storage entity that is realized as T-NET-BOX is designated EXTERNAL storage entity or second storage entity SPI2. Besides the answering machine AB, what is known as a missed calls list may also come into consideration as INTERNAL storage entity.

With the configuration illustrated in FIG. 6. events (e.g. the storage of messages of a variety of types, which are to be transmitted from an arbitrary network subscriber to the users/proprietors of the DECT mobile parts MT, RPP) can be transmitted to the DECT mobile parts MT, RPP by means of the standardized procedure "message waiting indication".

These events are signaled to the user/proprietor of the mobile part in a suitable manner, for instance by an LED or a screen display.

A fundamental problem is that these events can occur both within and without the telecommunication system DGS (operative word: INTERNAL storage entity or EXTERNAL storage entity).

Regardless, it is a precondition that the user have a DECT mobile part that supports the MWI service, this service is used to indicate to the user at his terminal device that a message has arrived for him at the INTERNAL storage entity and/or at the EXTERNAL storage entity while he was not at home.

Upon returning home, the user sees the indication that has come in and calls the corresponding storage entity.

This is the source of another problem. Namely, the user does not know which storage entity to call, the INTERNAL or the EXTERNAL entity.

This is because of the fact that, although the DECT base station BS, RFP can differentiate external and internal events, it does not have the ability to signal this to the DECT mobile part MT, RPP allocated to it.

SUMMARY OF THE INVENTION

The object on which the present invention is based consists in being able to distinguish between internal and external messages in the transmission of messages that are specific to "MWI service" in telecommunication networks, particularly in hybrid DECT/ISDN-specific telecommunication networks, for the purpose of displaying messages for the telecommunication subscriber that are filed in the telecommunication systems.

This object is inventively achieved in accordance with the present invention in a method for transmitting messages that are specific to "MWI Service" in telecommunication networks, particularly in hybrid DECT/ISDN-specific networks, said method comprising the steps of:

transmitting a "MWI-service"-specific message in a telecommunication system of a telecommunication network from a first telecommunication device to a second telecommunication device being specific to a telecommunication subscriber and being connected to said first telecommunication device by telecommunication;

indicating in said "MWI-service"-specific message that messages have been stored for said telecommunication subscriber;

transmitting originator information from said first telecommunication device to said second telecommunication device, said originator information for identifying entities in said telecommunication network for storing said message;

transmitting additional information from said first telecommunication device to said second telecommunication device, said additional information indicating whether said message is stored in an internal entity or an external entity of said telecommunication system;

transmitting said originator information and said additional information from said second telecommunication device back to said first telecommunication device in a deferred manner; and said first telecommunication device allocating said second telecommunication device to one of said internal entity and said external entity of said telecommunication system according to said transmitted back additional information.

The idea underlying the invention is that the equipment (e.g. the base station) that sends or forwards the MWI message to the terminal device (e.g. the DECT mobile part) that is allocated and connected to it transmits an additional indication that distinguishes between internal and external events.

This can have a variety of embodiments, though all of them can be traced back to the above stated fundamental solution.

According to the standardized protocol of the service "Message Waiting Indication", said equipment can cosend the call number of the corresponding server in the message waiting indication signaling. Here, based on the configuration in FIGS. 6 to 12, the internal and external entities can be distinguished implicitly or explicitly with the aid of the call number.

a) Implicit Solution

Assume that the EXTERNAL storage entity has the number "01301111", and that there is a message for the user of the mobile part. The EXTERNAL entity subsequently sends an ISDN message "message waiting indication" (external message) to the base station, which forwards this message to the mobile part transparently via the DECT air interface. When the user wants to retrieve the message, he dials the cotransmitted number of the EXTERNAL entity. This number is transparently forwarded by the base station, in turn. When the base station has an internal message in the INTERNAL entity allocated to it, which is arranged in the base station or outside the base station but within the telecommunication system, then, as in the case of the external message, the base station sends a message that appears to the mobile part to be identical, with the difference that here the number is unambiguously distinct from an external number in accordance with the international and national number schema; for instance, one such unambiguous number would be "***#*10100". When the user wants to retrieve the message, he dials this transmitted number of the INTERNAL entity. The base station evaluates the number dialed by the mobile part and branches to the internal entity if necessary.

The difficulty of this solution lies in specifying a suitable unambiguous number which does not conflict with national number schemas worldwide.

b) Explicit Solution

The indicated ISDN message "Message Waiting Indication" has additional information elements with the aid of which external events can be distinguished from internal events. These could be used by the mobile part either to address the base station internally or to address the telecommunication network externally. The problem in this solution is that the response of the allocated mobile part would vary depending on which information elements are sent by which network base stations. As a result, flexibility is lost in the mobile part, and even today it is necessary to adjust to a wide variety of network types.

These and other features of the invention(s) will become clearer with reference to the following detailed description of the presently preferred embodiments and accompanied drawings.

DETAILED DESCRIPTION OF THE PRESENTLY PREFERRED EMBODIMENTS

Figure 7:
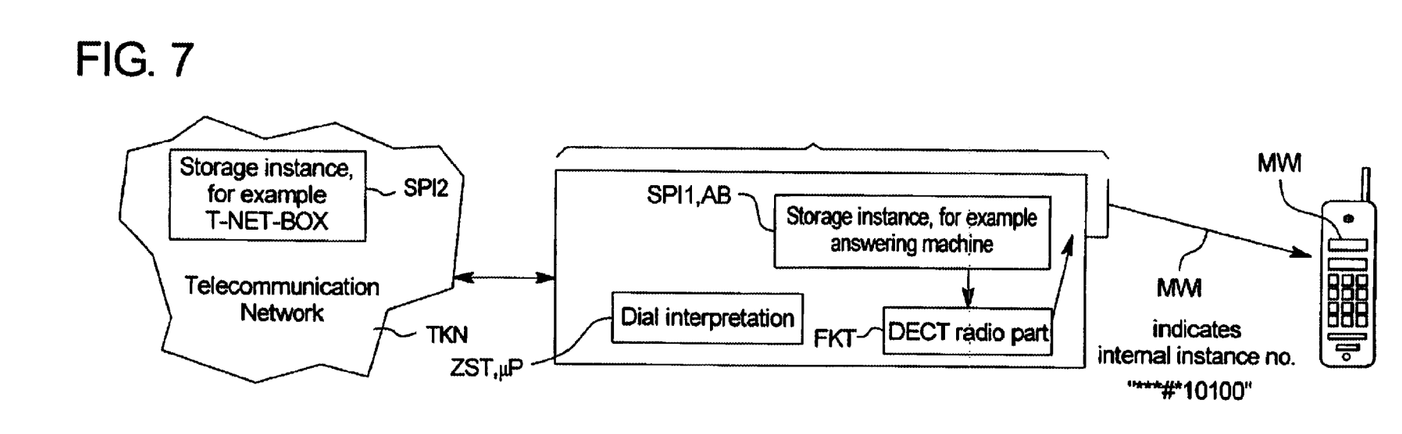
FIG. 7 is a functional block diagram showing indication of the event "storing a message for the user of the mobile part in the INTERNAL entity" to the user via an MWI message.
Figure 8:
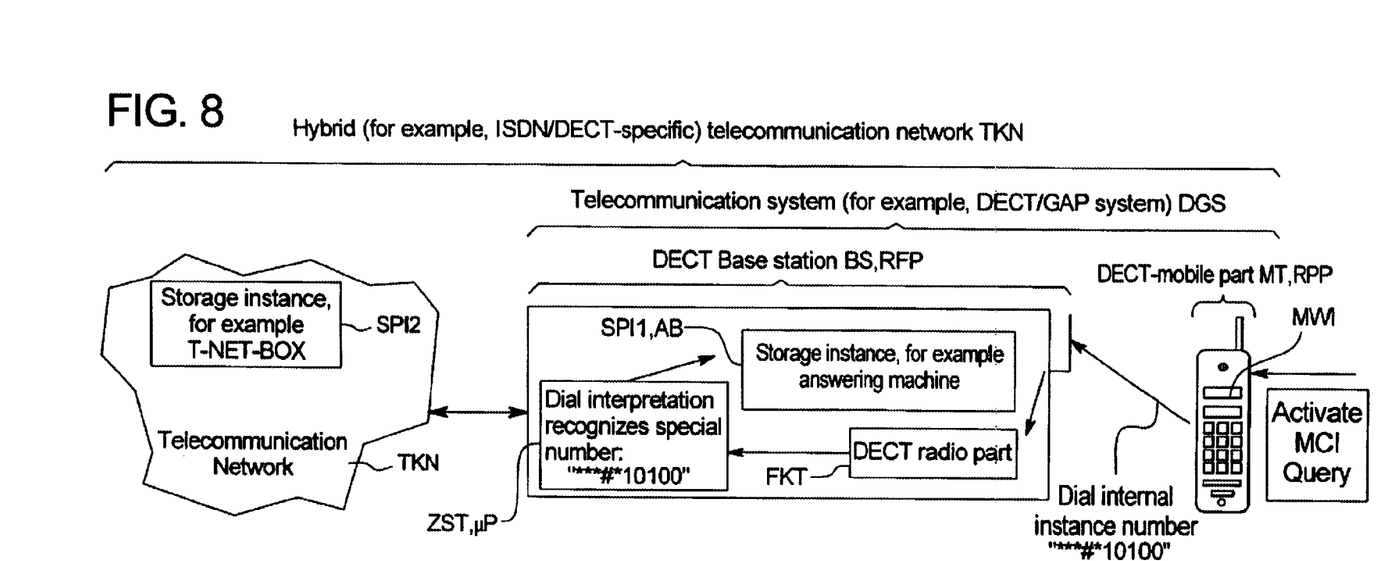
FIG. 8 is a functional block diagram showing activation of the MWI interrogation and transmission of dial information with the INTERNAL entity number to the base station.
Figure 9:
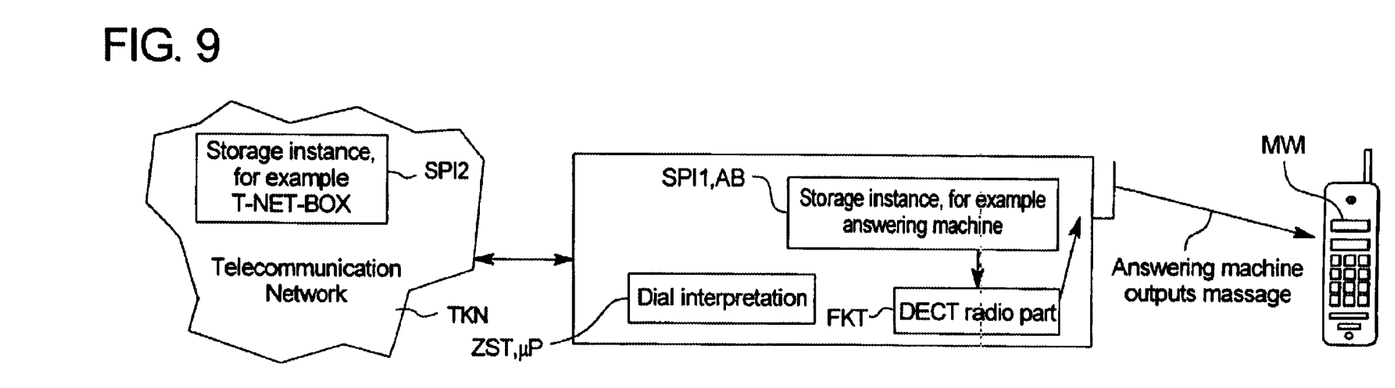
FIG. 9 is a functional block diagram showing transmission of the short message.

FIGS. 7 to 9 show an MWI scenario in which a message for the user of the mobile part is stored in the INTERNAL storage entity, this is indicated by the MWI service, and the message is outputted upon request.

Figure 10:
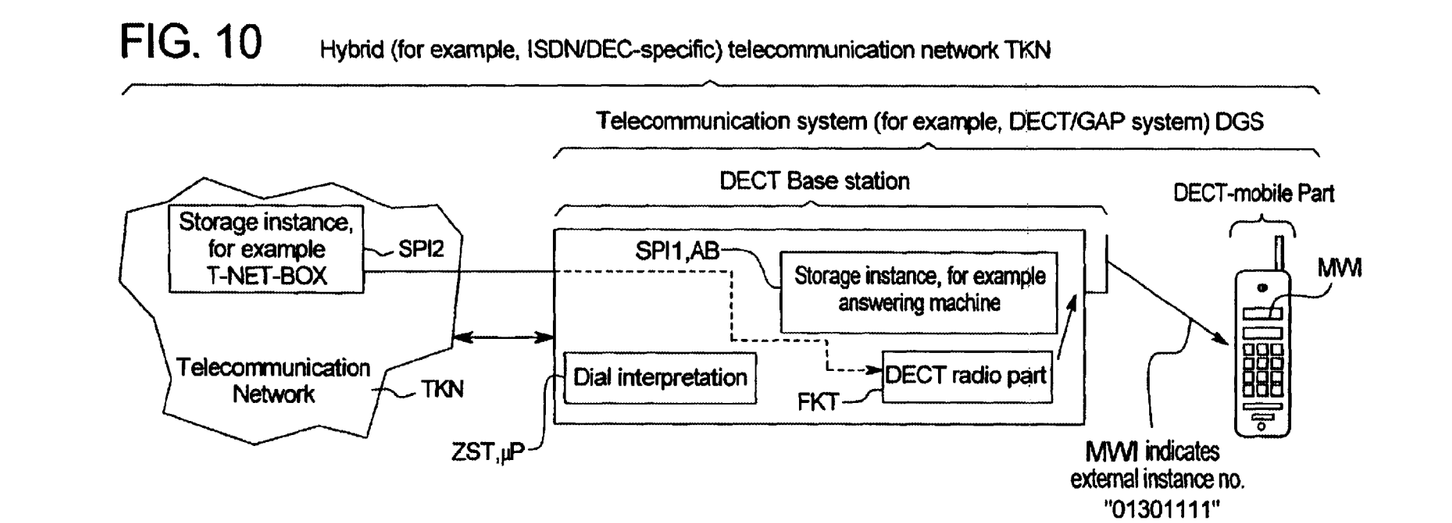
FIG. 10 is a functional block diagram showing indication of the event "storing a message for the user of the mobile part in the EXTERNAL entity" to the user via an MWI message.
Figure 11:
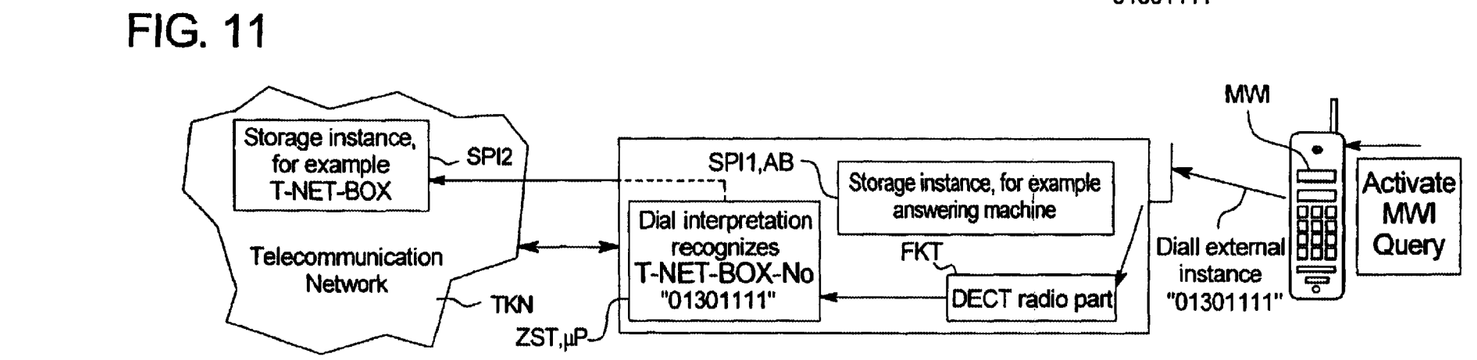
FIG. 11 is a functional block diagram showing activation of the MWI interrogation and transmission of dial information with the EXTERNAL entity number to the base station.
Figure 12:
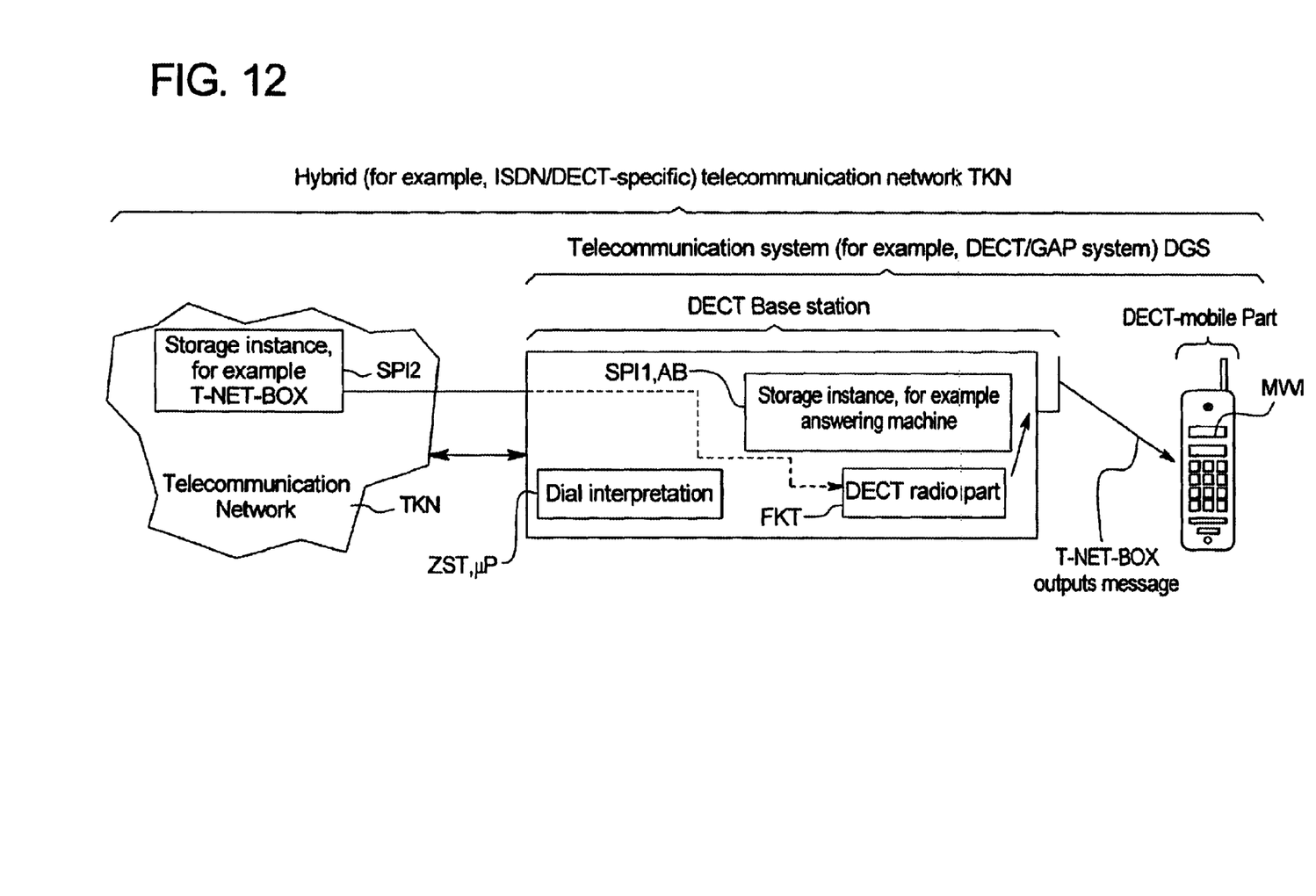
FIG. 12 is a functional block diagram showing transmission of the message.

FIGS. 10 to 12 show an MWI scenario in which a message for the user of the mobile part is stored in the EXTERNAL entity, this is indicated by the MWI service, and the message is outputted upon request.

FIG. 7 shows how the event "storing of a message for the user of the mobile part MT, RPP in the INTERNAL entity SPI1" is indicated to the user via an MWI message on the display of the mobile part. In particular, as originator information, the MWI message indicates a number "10100" that is specific to a DECT base station, with the aid of which number the base station BS, RFP and the INTERNAL entity can be identified; and as additional information, it indicates a supplementary number "****#*" that is generated by the base station BS, RFP. It is transmitted from the base station BS, RFP directly to the mobile part MT, RPP.

Using the supplementary number, the event "storing a message for the user of the mobile part MT, RPP in the INTERNAL entity SPI1" (as shown in FIGS. 7 to 9) and the event "storing a message for the user of the mobile part MT, RPP in the EXTERNAL entity SPI2" (as shown in the FIGS. 10 to 12) can be distinguished.

The supplementary number "****#*" is advantageously affixed in front of the number "10100" which is specific to the DECT base station. Alternatively, other variants are possible; for instance, affixing the supplementary number "after the number "10100" that is specific to the DECT base station.

Instead of linking the additional information to the INTERNAL entity number, it is also possible to link the additional information to the EXTERNAL entity number (cf. FIGS. 10 to 12). In this case, the additional information can then either be generated by the telecommunication network TKN or, as described above, by the base station.

FIG. 8 shows how the MWI interrogation is activated upon input by the user at the mobile part MT, RPP, and how dial information with the INTERNAL entity number "****#*10100" is consequently transmitted to the base station BS, RFP. In the base station, this number is re-recognized as such by the selection code interpretation ZST, $\mu$P, owing to the artificially generated supplementary number "****#*" INTERNAL entity number that is designated special number. The answering machine AB or the INTERNAL entity SPI1 is then actuated to output the message.

FIG. 9 shows how the short message is transmitted by the base station BS, RFP to the mobile part MT, RPP.

FIG. 10 shows how the event "storing a message for the user of the mobile part MT, RPP in the EXTERNAL entity SPI2" is indicated to the user via an MWI message on the display of the mobile part. In particular, as originator information, the MWI message indicates a T-NET-BOX number "01301111" with the aid of which the telecommunication network TKN and the EXTERNAL entity can be identified. It is transmitted from the telecommunication network TKN to the base station BS, RFP and from this to the mobile part MT, RPP.

FIG. 11 shows how the MWI interrogation is activated upon input by the user at the mobile part MT, RPP, and how, as a consequence, dial information with the EXTERNAL entity number "01301111" is transmitted to the base station BS, RFP. In the base station, this number is recognized by the selection code interpretation ZST, $\mu$P as a number intended for the telecommunication network TKN and is accordingly forwarded to the T-NET-BOX in the telecommunication network TKN. The T-NET-BOX, or respectively, the EXTERNAL entity SPI2, is then controlled to output the message.

FIG. 12 shows how the payload message is transmitted from the telecommunication network TKN to the mobile part MT, RPP via the base station BS, RFP.

Although modifications and changes may be suggested by those of ordinary skill in the art, it is the intention of the inventors to embody within the patent warranted hereon all changes and modifications as reasonably and properly come within the scope of their contribution to the art.

I claim:

1. A method for transmitting messages that are specific to "MWI Service" in telecommunication networks, said method comprising the steps of:

transmitting a "MWI-service"-specific message in a telecommunication system of a telecommunication network from a first telecommunication device to a second telecommunication device being specific to a telecommunication subscriber and being connected to said first telecommunication device by telecommunication;

indicating in said "MWI-service"-specific message that messages have been stored for said telecommunication subscriber;

transmitting originator information from said first telecommunication device to said second telecommunication device, said originator information for identifying entities in said telecommunication network for storing said message;

transmitting additional information from said first telecommunication device to said second telecommunication device, said additional information indicating whether said message is stored in an internal entity or an external entity of said telecommunication system;

transmitting said originator information and said additional information from said second telecommunication device back to said first telecommunication device in a deferred manner; and said first telecommunication device allocating said second telecommunication device to one of said internal entity and said external entity of said telecommunication system according to said transmitted back additional information.

2. The method as claimed in claim 1, further comprising the steps of:

transmitting said MWI-Service"-specific message and said originator information from a telecommunication network equipment in said telecommunication network outside said telecommunication system to said first telecommunication device being connected to said telecommunication network equipment by telecommunication.

3. The method as claimed in claim 2, wherein said telecommunication network equipment in said telecommunication network is T-NET-BOX equipment.

4. The method as claimed in claim 2, wherein said external entity is allocated to said telecommunication network equipment.

5. The method as claimed in claim 1, wherein said telecommunication network one of a public wirebound or wireless network.

6. The method as claimed in claim 1, wherein said internal entity is allocated to said first telecommunication device.

7. The method as claimed in claim 6, wherein said internal entity of said first telecommunication device is at least one of an SMS storage unit, missed calls lists, and answering machines that are integrated in said first telecommunication device.

8. The method as claimed in claim 1, wherein said first telecommunication device is a DECT base station.

9. The method as claimed in claim 1, wherein said second telecommunication device is a DECT mobile part.

10. The method as claimed in claim 1, wherein said first telecommunication device is a base station and said second telecommunication device is a mobile part, said first and second telecommunication devices being based on hybrid multiplex methods consisting of the DMA, FDMA, and TDMA methods.

11. The method as claimed in claim 4, further comprising the step of:

forming said originator information in said telecommunication network equipment as equipment-specific information.

12. The method as claimed in claim 6, further comprising the step of:

forming said originally information in said first telecommunication device as device-specific information.

13. The method as claimed in claim 1, further comprising the step of:

integrating said originator information into said "MWI-service"-specific messages as a controlling user number.

14. The method as claimed in claim 1, further comprising the step of:

integrating said additional information into said "MWI-service"-specific messages as additional information.

15. The method as claimed in claim 1, further comprising the step of:

transmitting said additional information at least one message that is additional to said "MWI-service"-specific messages.

16. The method as claimed in claim 14, further comprising the steps of:

forming said additional information in said telecommunication network equipment; and transmitting said formed additional information from said telecommunication network equipment to said first telecommunication device.

17. The method as claimed in claim 14, further comprising the step of:

forming said additional information in said first telecommunication device.

18. The method as claimed in claim 1, further comprising the step of:

adding said additional information to said originator information as unambiguous supplementary information that has not yet been assigned elsewhere for telecommunication purposes.

19. The method as claimed in claim 18, wherein said supplementary information comprises a character set "***#*".

20. The method as claimed in claim 18, further comprising the step of:

affixing said supplementary information in front of said originator information.

21. The method as claimed in claim 18, further comprising the step of:

forming said supplementary information and said originator information in said first telecommunication device as device-specific information.

22. The method as claimed in claim 1, wherein said telecommunication networks are hybrid DECT/ISDM-specific networks.

* * * * *